United States Patent
Joshi

(10) Patent No.: US 8,108,664 B2
(45) Date of Patent: Jan. 31, 2012

(54) FAST AND COMPACT CIRCUIT FOR BUS INVERSION

(75) Inventor: Mayur Joshi, Dallas, TX (US)

(73) Assignee: Round Rock Research, LLC, Mt. Kisco, NY (US)

( * ) Notice: Subject to any disclaimer, the term of this patent is extended or adjusted under 35 U.S.C. 154(b) by 355 days.

(21) Appl. No.: 12/367,941

(22) Filed: Feb. 9, 2009

(65) Prior Publication Data

US 2009/0177825 A1 Jul. 9, 2009

Related U.S. Application Data

(60) Continuation of application No. 11/448,748, filed on Jun. 8, 2006, now Pat. No. 7,506,146, which is a division of application No. 10/771,435, filed on Feb. 5, 2004, now Pat. No. 7,406,608.

(51) Int. Cl.
*G06F 9/305* (2006.01)
*G06F 11/00* (2006.01)
*G06F 1/32* (2006.01)
*G06F 13/20* (2006.01)
*H03K 19/23* (2006.01)

(52) U.S. Cl. ............ 713/1; 713/300; 326/11; 326/26; 714/43

(58) Field of Classification Search ........ 713/1, 300; 326/11, 26; 714/43
See application file for complete search history.

(56) References Cited

U.S. PATENT DOCUMENTS

| | | | |
|---|---|---|---|
| 6,046,943 A | 4/2000 | Walker | |
| 6,243,779 B1 | 6/2001 | Devanney et al. | |
| 6,489,900 B2 | 12/2002 | Shin et al. | |
| 6,553,445 B1 | 4/2003 | Drapkin et al. | |
| 6,584,526 B1 | 6/2003 | Bogin et al. | |
| 6,788,222 B2 | 9/2004 | Hall et al. | |
| 2001/0002829 A1 | 6/2001 | Nishimura | |
| 2002/0156953 A1 | 10/2002 | Beiley et al. | |
| 2003/0046483 A1 | 3/2003 | Moschopoulos | |
| 2003/0158981 A1 | 8/2003 | LaBerge | |
| 2003/0227403 A1 | 12/2003 | Nakagawa et al. | |
| 2004/0065904 A1 | 4/2004 | Yoshida et al. | |
| 2004/0068594 A1 | 4/2004 | Asaro et al. | |
| 2004/0099913 A1 | 5/2004 | Fulkerson | |
| 2005/0132112 A1* | 6/2005 | Pawlowski | 710/110 |
| 2005/0216630 A1 | 9/2005 | Gaskins et al. | |
| 2006/0184757 A1 | 8/2006 | Yeh et al. | |

OTHER PUBLICATIONS

Kazuyuki Nakamura et al., "A 50% Noise Reduction Interface Using Low-Weight Coding," 1996 Symposium on VLSI Circuits Digest of Technical Papers, pp. 144-145.
Mircea Stan, et al., "Bus-Invert Coding for Low-Power I/O," IEEE Transactions on Very Large Scale Integration (VLSI) Systems, vol. 3, No. 1, Mar. 1995.
Naehyuck Chang et al., "Bus Encoding for Low-Power High-Performance Memory Systems."

* cited by examiner

*Primary Examiner* — Kim Huynh
*Assistant Examiner* — Fahmida Rahman
(74) *Attorney, Agent, or Firm* — Lerner, David, Littenberg, Krumholz & Mentlik, LLP

(57) ABSTRACT

A bussed system with a fast and compact majority voter in the circuitry responsible for the bus inversion decision. The majority voter is implemented in analog circuitry having two branches. One branch sums the advantage of transmitting the bits without inversion, the other sums the advantage of transmitting the bits with inversion. The majority voter computes the bus inversion decision in slightly more than one gate delay by simultaneously comparing current drive in each branch.

9 Claims, 7 Drawing Sheets

FAST AND COMPACT CIRCUIT FOR BUS INVERSION

This application is a continuation of application Ser. No. 11/448,748, filed Jun. 8, 2006, now U.S. Pat. No. 7,506,146, which is a division of application Ser. No. 10/771,435, filed Feb. 5, 2004, now U.S. Pat. 7,406,608, which is hereby incorporated by reference in its entirety.

FIELD OF THE INVENTION

The invention relates generally to communications over a bus and, more particularly to a fast and compact majority voter circuit for bus inversion in a bussed system.

BACKGROUND

Most processing systems (e.g., computer or processor system) use high-speed, high bandwidth communication buses to transfer data, address and command information between components of the system. The components may include processors, memory subsystems and input/output devices.

A data bus, for example, is used to transmit data between two or more components and possibly to external devices. Data is typically transmitted as bytes or words (formed of multiple bytes) as opposed to individual bits. As such, the typical bus includes respective bus lines for each bit in the byte/word to be transferred, Each bus line has two possible states, one representing a first binary or logical value (e.g., "0") and the other state representing a second binary/logical value (e.g., "1").

Electronic switching noise occurs when a bus line switches from a first state to a second state (i.e., noise occurs when the bit on the bus transitions from a 1 to a 0 or a 0 to a 1). The amount of switching noise increases in an approximately linear fashion from an essentially non-zero noise condition (when no bits switch states) to a worst case switching noise condition (when all of the bits in a multi-bit word switch states at the same time). It is desirable to reduce the amount of switching noise on a bus that results from the transitioning of logical states of the data bits transmitted on the bus.

FIG. 1 is a block diagram illustrating a typical bussed system 10. The system includes a bus master 20 (e.g., a processor, microprocessor, application specific integrated circuit (ASIC)) and a bus slave 30 (e.g., memory circuit). The bus master 20 controls and communicates with the slave 30 over a control bus 40, address bus 50, data bus 60 and with clock signal lines 70. The system 10 may experience noise on any of the buses 40, 50, 60, 70.

Moreover, in some systems, driving a particular binary or logical value on a bit line will consume more power than when the other binary/logical value is driven on the bit line. For example, in some systems, driving a logical 0 on the bus line consumes more power than driving a 1 on the same bus line. Similarly, there are some systems in which driving a logical 1 on the bus line consumes more power than driving a 0 on the same bus line. It is desirable to reduce the energy consumed in a bussed system.

Bus inversion has been used to reduce noise and power consumption in a bussed system. Bus inversion compares existing bits on the bus (i.e., bits already transmitted, often referred to as "previous bits") to bits to-be-transmitted (often referred to as the "preview bits" or "future bits") to determine how many bit transitions from the previous bits will occur when the preview bits are transmitted, Bus inversion will invert all of the preview bits before transmitting them, if it is determined that inverting the bits would improve system performance (e.g., lower power consumption, produce less switching noise). Typically, an additional bit is used to indicate to a receiving device if the bits in the data word have been inverted or not. This bit is often referred to as the "inversion bit". The receiving device inspects the inversion bit and determines if the bits have been inverted. If the received bits were inverted, the receiving device must invert the received bits before using or storing them.

In computing whether the bits on the bus should be inverted (or not), conventional techniques use digital logic. The digital logic includes several gates and possibly several adder circuits to make the inversion decision. Since the decision process involves multiple gates, unwanted gate delays are introduced into the process. This is undesirable. Accordingly, there is a need and desire to minimize gate delays to reduce latency, layout area and power consumption during the bus inversion decision process.

SUMMARY

The present invention provides bus inversion circuitry that minimizes gate delays and reduces latency, layout area and power consumption during the bus inversion decision process.

The above and other features and advantages are achieved in various embodiments of the invention by providing bussed system with a fast and compact majority voter in the circuitry responsible for the bus inversion decision. The majority voter is implemented in analog circuitry having two branches. One branch sums the advantage of transmitting the bits without inversion, the other sums the advantage of transmitting the bits with inversion. The majority voter computes the bus inversion decision in slightly more than one gate delay by simultaneously comparing current drive in each branch.

BRIEF DESCRIPTION OF THE DRAWINGS

The foregoing and other advantages and features of the invention will become more apparent from the detailed description of exemplary embodiments provided below with reference to the accompanying drawings, in which.

DETAILED DESCRIPTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention.

Figure 2:
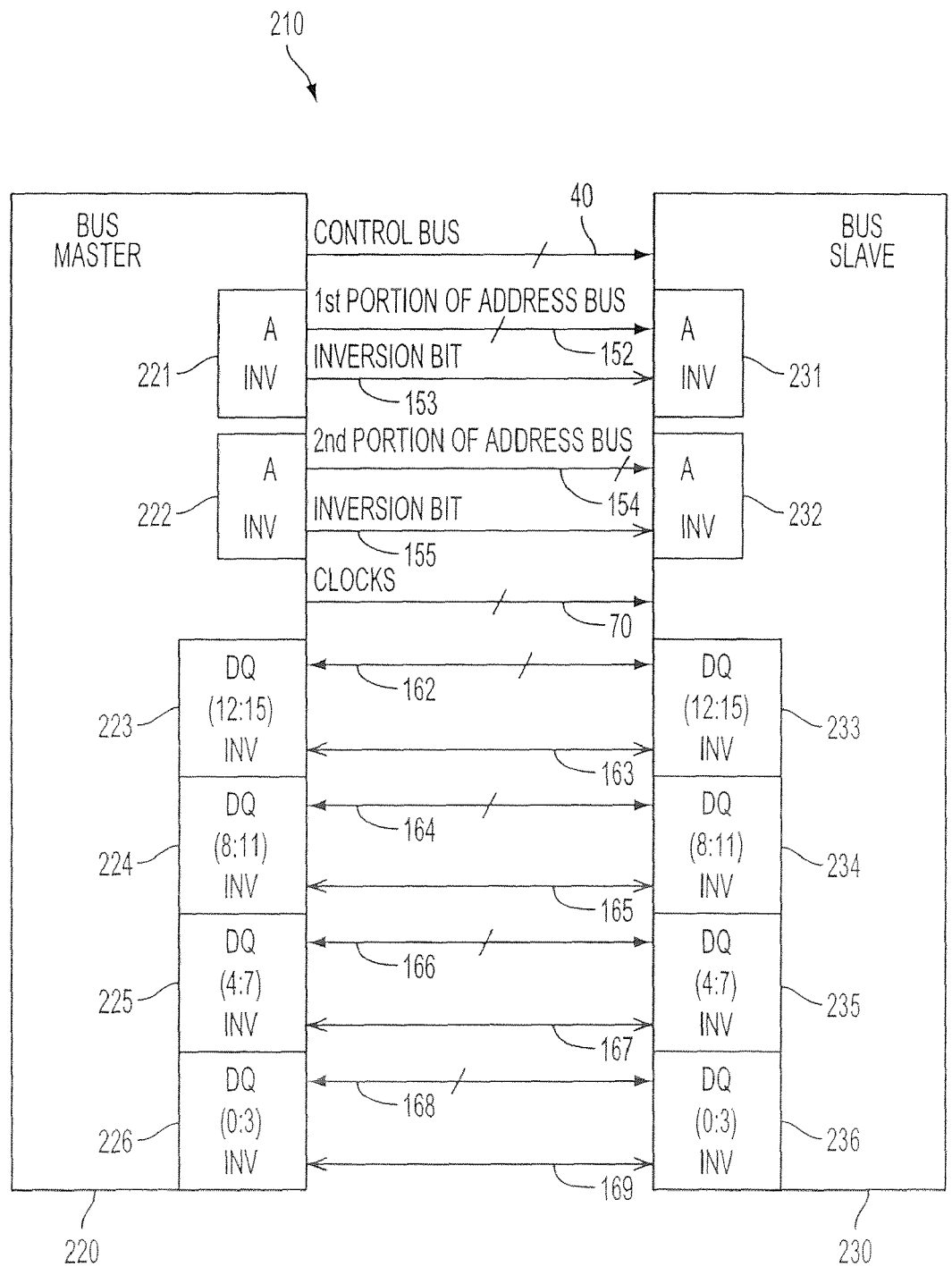
FIG. 2 is a block diagram illustrating a bussed system constructed in accordance with an exemplary embodiment of the invention.

Now referring to the figures, where like reference numbers designate like elements, FIG. 2 is a block diagram illustrating a bussed system 210 constructed in accordance with an exemplary embodiment of the invention. The system 210 includes a bus master 220 and a bus slave 230. The bus master 220 may be a processor, microprocessor, or application specific integrated circuit (ASIC) designed to control other components. The bus slave 230 may be a memory circuit such as e.g., a random access memory (RAM), static RAM (SRAM), dynamic RAM (DRAM), synchronous DRAM (SDRAM), flash memory, other memory device or any device for receiving digital data. The bus slave may be any device that communicates over a bus with another electrical component. It should be appreciated that the invention is not limited to any specific type of bus master 220 or slave 230.

Figure 1:
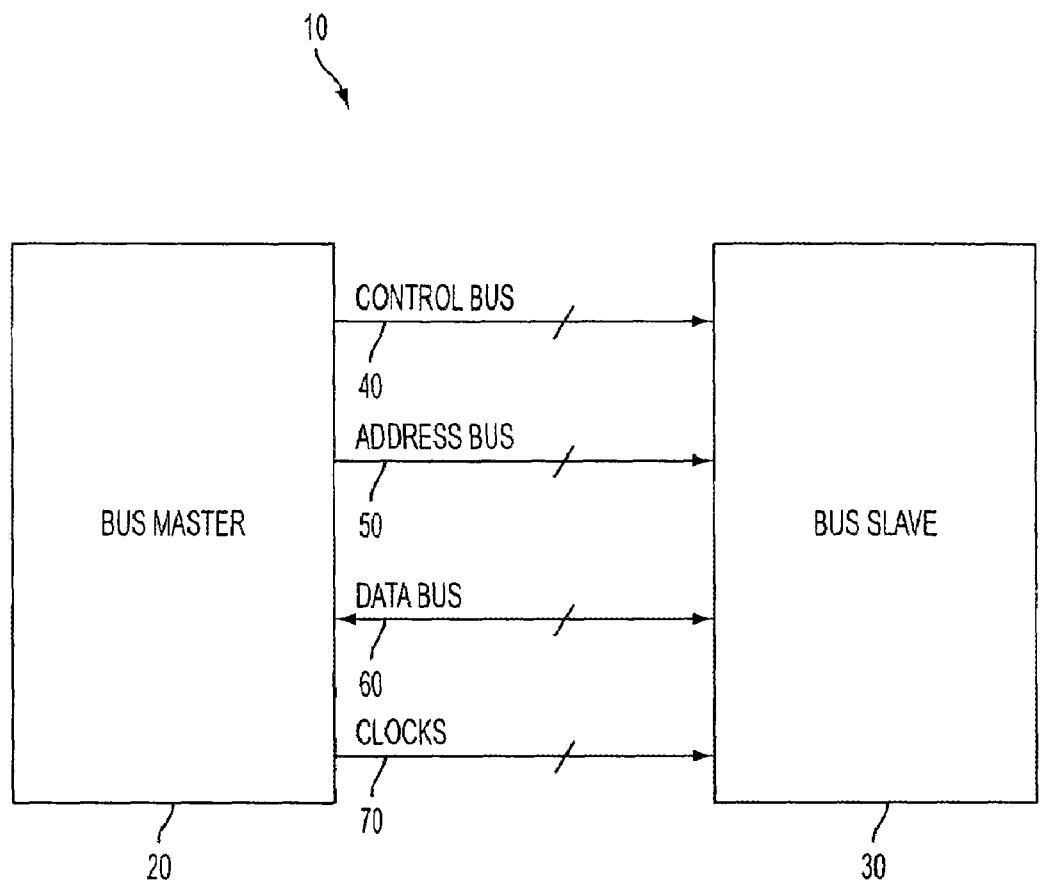
FIG. 1 is a block diagram illustrating a typical bussed system.

In the illustrated embodiment, the conventional address bus 50 (FIG. 1) is divided into two address buses 152, 154, with each bus 152, 154 having an associated inversion bit line 153, 155. In the illustrated embodiment, each address bus 152, 154 contains enough address bus lines to accommodate one half of an address required by the system 210. In the illustrated example, each address bus 152, 154 contains eight lines corresponding to eight bits of an address.

It should be appreciated that the invention is not to be limited to 8-bit address buses 152, 154. For example, the invention could use one 16-bit address bus with one inversion bit; the invention could use four 4-bit address buses with 4 associated inversion bits. All that is required is that the address buses 152, 154 have associated inversion bits and that the components connected to the buses 152, 154 perform inversion processing using the circuitry described below with respect to FIGS. 3-6.

In the illustrated embodiment, the conventional data bus 60 (FIG. 1) is replaced by four smaller data buses 162, 164, 166, 168, with each bus 162, 164, 166, 168 having an associated inversion bit line 163, 165, 167, 169. In FIG. 2, the four data buses 162, 164, 166, 168 each comprise one fourth of the required data bus. Thus, each data bus 162, 164, 166, 168 contains enough data bit lines to accommodate one fourth of the data lines required by the system 210. In the illustrated example, each data bus 162, 164, 166, 168 contains four lines corresponding to four bits of data. That is, bus 162 contains lines for carrying data bits DQ[12:15], bus 164 contains lines for carrying data bits DQ[8:11], bus 164 contains lines for carrying data bits DQ[4:7] and bus 168 contains lines for carrying data bits DQ[0:3].

It should be appreciated that the invention is not to be limited to 4 bit data buses 162, 164, 166, 168. For example, the invention could use one 16-bit data bus with one inversion bit; the invention could use two 8-bit data buses with two associated inversion bits. All that is required is that the data buses 162, 164, 166, 168 have associated inversion bits and that the components connected to the buses 162, 164, 166, 168 perform inversion processing using the circuitry described below with respect to FIGS. 3-6.

To accommodate the buses in the system, the bus master 220 contains address drivers 221, 222 to drive the address buses 152, 154 and inversion bit lines 153, 155 and data drivers/receivers 223, 224, 225, 226 for driving and/or receiving data over the data buses 162, 164, 166, 168 and inversion bit lines 163, 165, 167, 169. The bus slave 230 contains address receivers 231, 232 for receiving address and inversion bits over the address buses 152, 154 and inversion bit lines 153, 155 and data drivers/receivers 233, 234, 235, 236 for driving and/or receiving data over the data buses 162, 164, 166, 168 and inversion bit lines 163, 165, 167, 169. The bus master 220 also controls and communicates with the slave 230 over a control bus 40 and clock signal lines 70.

It should be noted that the control bus 40 could also be subject to bus inversion according to the invention if so desired. A typical control bus 40 includes signals such as R/W# (read if 1, write if 0), CE# (chip enabled if 0), REF# (DRAM refresh if 0) and DM (data write mask if 1). The number of transitions between states of the bits of the control bus 70 could be reduced using bus inversion. Likewise, if transmitting one logical value (e.g., logical 1) is more beneficial than transmitting the other logical value (e.g., logical 0), then bus inversion in accordance with the invention could also be used.

Figure 3:
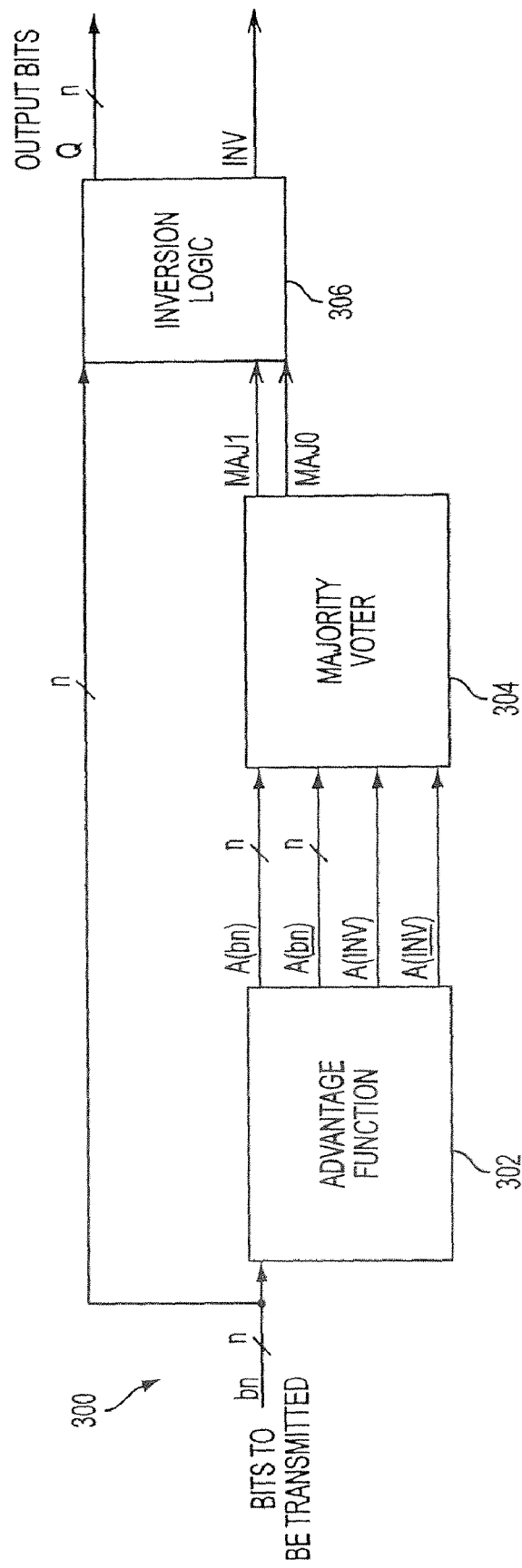
FIG. 3 is a block diagram illustrating a bus inversion circuit constructed in accordance with an exemplary embodiment of the invention.

FIG. 3 is a block diagram illustrating a bus inversion circuit 300 constructed in accordance with an exemplary embodiment of the invention. The illustrated circuit includes an advantage function circuit 302, majority voter circuit 304 and inversion logic 306.

The advantage function circuit 302 receives n bits to be transmitted bn (i.e., preview bits). The advantage function circuit 302 calculates the advantage of inversion and non-inversion for each bit and a corresponding inversion bit, and outputs the advantages of non-inversion $A(bn)$ and inversion $A(\overline{bn})$ for each bit, and the advantages of non-inversion $A(\overline{inv})$ and inversion $A(inv)$ for the inversion bit. The advantages $A(bn)$, $A(\overline{bn})$, $A(\overline{inv})$, $A(inv)$ may be computed in numerous ways. The following description lists two examples of how the advantages $A(bn)$, $A(\overline{bn})$, $A(inv)$, $A(\overline{inv})$ may be computed. It should be appreciated that the advantages $A(bn)$, $A(\overline{bn})$, $A(inv)$, $A(\overline{inv})$ may be computed in other manners deemed appropriate for the desired application.

For example, if transmitting a logic 0 on the bus consumes more power than transmitting a logic 1, the main objective of the bus inversion process is to ensure that as many logic 1's as possible are transmitted. Therefore, if a particular bit bn is a logical 1, the advantage function $A(bn)$ will output a 1 to indicate an advantage for the bit bn to be transmitted without inversion. If the bit bn is a logical 0, the advantage function $A(bn)$ will output a 0 to indicate a disadvantage of transmitting the bit bn without inversion. As such, for the advantage of transmitting logical 1's over logical 0's, the advantage function $A(bn)$ is defined as $A(0)=0$, $A(1)=1$. It should be appreciated that if it were desirable to transmit logic 0's over logic 1's then the advantage function $A(bn)$ would be defined as $A(0)=1$, $A(1)=0$.

If on the other hand, the main objective of the bus inversion process is to minimize the number of transitions (i.e., reduce switching noise), then the advantage function $A(bn)$ is an exclusive NOR ("XNOR") between the preview bits and the last bits transmitted on the bus. That is, $A(bn)=(bn\ XNOR\ dn)$, where dn is the bits previously transmitted on the bus. In the illustrated embodiment, $A(bn)$ outputs a 1 to indicate an advantage of not inverting a bit bn (i.e., bn is the same logical value as dn) and a 0 to indicate the disadvantage of not inverting the bit bn (i.e., bn is not the same logical value as dn, which would cause a transition on the bus). An advantage function $A(inv)$ for the inversion bit can also be computed. For the inversion bit, $A(inv)=(inv\ XNOR\ dinv)$, where dinv is the previous value of the inversion bit.

Regardless of the function performed, the advantage function circuit 302 computes an advantage function $A(bn)$ of the bits bn without inversion and an advantage function A(bn) of the bits with inversion (shown as bn). The advantage function A(bn) is computed using the values of inverted preview bits bn. Alternatively, A(bn) may be computed by merely inverting the outputs of A(bn). The results of each advantage function A(bn), A(bn) are respectively summed in the majority voter circuit 304 (described below), which performs the comparison M(bn)=(ΣA(bn)+A(inv)<ΣA(bn)+A(inv)). The result of the comparison is used to determine if the bits bn should be inverted before being transmitted on the bus.

The majority voter circuit 304 receives the advantages of non-inversion A(bn) and inversion A(bn) for each bit, and the advantages of non-inversion A(inv) and inversion A(inv) for the inversion bit and outputs a first majority voter output maj1 and a second majority voter output maj0. As is described below in more detail with respect to FIG. 4, the first output maj1 indicates whether the summed advantages of non-inversion ΣA(bn)+A(inv) is greater than or equal to the summed advantages of inversion ΣA(bn)+A(inv). As such, if the summed advantages of non-inversion ΣA(bn)+A(inv) is greater than or equal to the summed advantages of inversion ΣA(bn)+A(inv), the first output maj1 is a logical 1; otherwise, the first output is a logical 0. The second output maj0 indicates whether the summed advantages of inversion ΣA(bn)+A(inv) is greater than the summed advantages of non-inversion ΣA(bn)+A(inv). As such, if the summed advantages of inversion ΣA(bn)+A(inv) is greater than the summed advantages of non-inversion ΣA(bn)+A(inv), the second output maj0 is a logical 1; otherwise, the second output is a logical 0. In general the equality between the two branches does not matter. If both inversion and non-inversion confer the same advantages, it is irrelevant which one is chosen. In the illustrated embodiment, there are an odd number of inputs (8 data bits and an inversion bit) so equality between the branches would never be achieved. However, for an even number of inputs, a transistor with half the drive of other summer transistors would be required in one of the summer circuits (319 or 339) to break a tie between the branches.

The illustrated majority voter circuit 304 uses two outputs maj1, maj0. It should be appreciated that a single output could be used if so desired. All that is required is that the single output have one value indicating the summed advantages of non-inversion τA(bn)+A(inv) is greater than or equal to the summed advantages of inversion ΣA(bn)+A(inv) and a second value indicating that the summed advantages of inversion ΣA(bn)+A(inv) is greater than the summed advantages of non-inversion ΣA(bn)+A(inv).

The inversion logic 306 inputs the preview bits bn and the majority voter outputs maj1, maj0 and outputs bits Q on the bus and an inversion bit INV on an inversion bit line. The output bits Q are either the preview bits bn without inversion (e.g., if maj1 is a logical 1) or inverted preview bits bn (e.g., if maj0 is a logical 1). If the preview bits bn are transmitted without inversion, the inversion bit INV has a value indicating that the bits bn have not been inverted.

Figure 4:
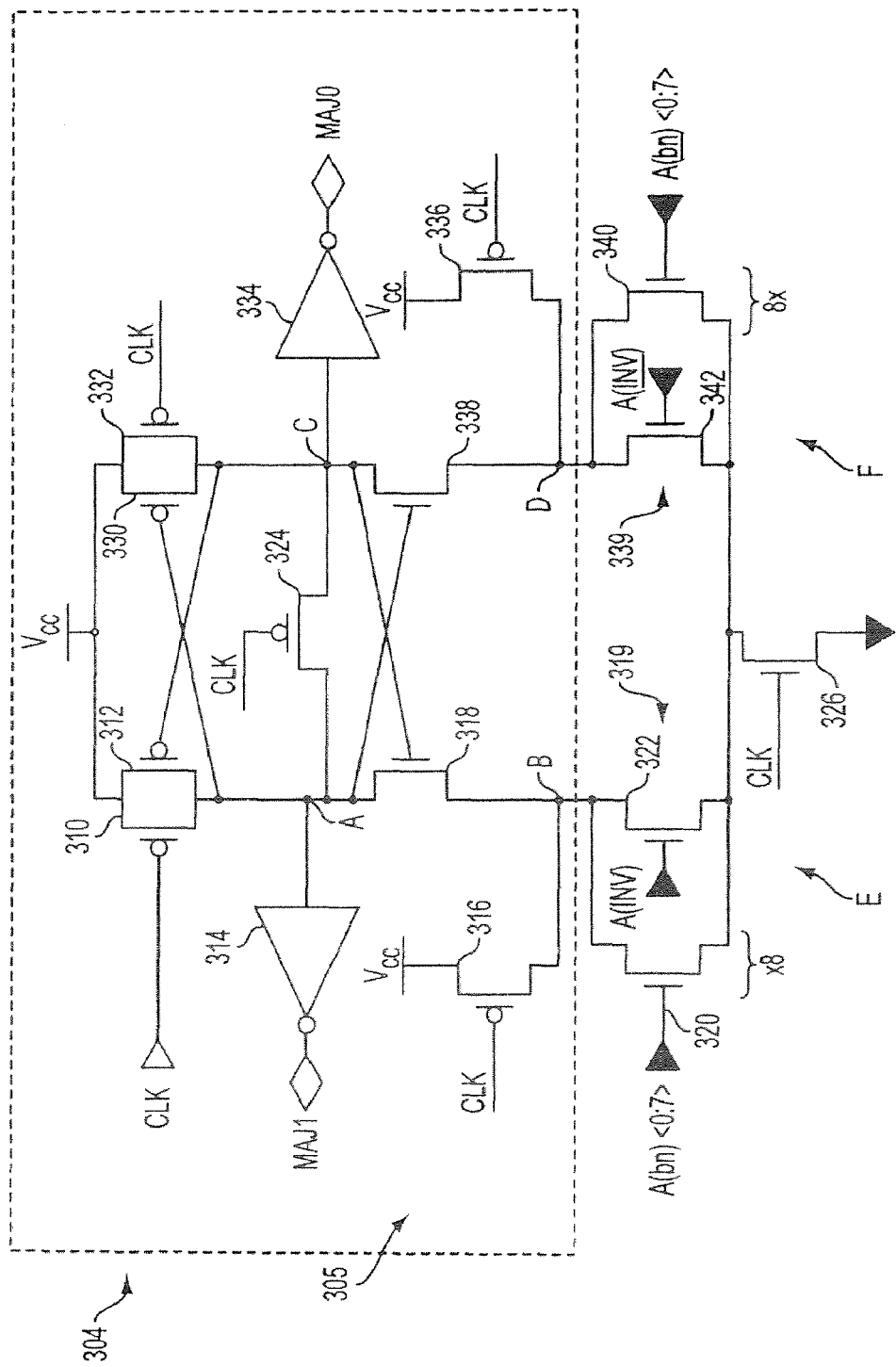
FIG. 4 is a schematic diagram illustrating an exemplary majority voter used in the bus inversion circuit illustrated in FIG. 3.

FIG. 4 is a schematic diagram illustrating an exemplary majority voter circuit 304 used in the bus inversion circuit 300 illustrated in FIG. 3. The majority voter circuit 304 includes seven p-channel transistors 310, 312, 316, 324, 330, 332, 336, three n-channel transistors 318, 326, 338, two inverters 314, 334 and two summer circuits 319, 339.

The first p-channel transistor 310 has its gate connected to a clock signal CLK and is connected between a supply voltage Vcc and a first node A. The third p-channel transistor 316 is connected between the supply voltage Vcc and a second node B and has its gate connected to the clock signal CLK. The second p-channel transistor 312 is connected across the first p-channel transistor 310 and has its gate connected to a third node C. The fourth p-channel transistor 324 is connected between the first and third nodes A, C and also has its gate connected to the clock signal CLK.

The fifth p-channel transistor 330 is connected across the sixth p-channel transistor 332 and has its gate connected to the first node A. The sixth p-channel transistor 332 has its gate connected to the clock signal CLK and is connected between the supply voltage Vcc and the third node C. The seventh p-channel transistor 336 is connected between the supply voltage Vcc and a fourth node D.

The input of the first inverter 314 is connected to the first node A. The output of the first inverter 314 is the first majority voter output signal maj1. The input of the second inverter 334 is connected to the third node C. The output of the second inverter 334 is the second majority voter output signal maj0. The first n-channel transistor 318 is connected between the first and second nodes A, B and has its gate connected to the third node C. The second n-channel transistor 326 is connected between a ground potential and a connection between the first and second summer circuits 319, 339. The third n-channel transistor 338 is connected between the third and fourth nodes C, D and has its gate connected to the first node A. Collectively, the seven p-channel transistors 310, 312, 316, 324, 330, 332, 336, first and third n-channel transistors 318, 338 and inverters 314, 334 comprise a comparison circuit 305. As is described below in more detail, the comparison circuit 305 outputs the first and second majority voter output signals maj1, maj0 based upon the comparison M(bn)=(ΣA (bn)+A(inv)<ΣA(bn)+A(inv)).

The first summer circuit 319 is connected between the second node B and the second n-channel transistor 326. The second summer circuit 339 is connected between the fourth node D and the second n-channel transistor 326. The illustrated first summer circuit 319 includes eight n-channel transistors 320 having their gates respectively connected to one bit of the advantage functions without inversion A(bn)<0:7>. The illustrated first summer circuit 319 includes a ninth n-channel transistor 322 having its gate connected to the advantage function for the inversion bit indicating non-inversion A(inv). Similarly, the second summer circuit 339 includes eight n-channel transistors 340 having their gates respectively connected to one bit of the advantage functions with inversion A(bn)<0:7>. The illustrated second summer circuit 339 includes a ninth n-channel transistor 342 having its gate connected to the advantage function for the inversion bit indicating inversion A(inv).

The first summer circuit 319, nodes A and B, the first inverter 314 and its output maj1 make up a first branch E of the majority voter circuit 304. The second summer circuit 339, nodes C and D, the second inverter 334 and its output maj0 make up a second branch E of the majority voter circuit 304.

The operation of the majority voter circuit 304 is now described. When the clock signal CLK is low, the circuit 304 is in a precharge mode. During the precharge mode, all of the nodes A, B, C, D are charged to the supply voltage Vcc. This occurs because the low clock signal CLK turns on the first, third, fourth, sixth and seventh p-channel transistors 310, 316, 324, 332, 336 and turns off the second n-channel transistor 326.

During the precharge mode, the Vcc potential at the first and third nodes A, C activate the first and third n-channel transistors 318, 338. Since there is a Vcc potential at the first and third nodes A, C, the inverters 314, 334 cause the first and second majority outputs maj1, maj0 to be zero. Thus, during precharge, the nodes A, B, C, D are held high (i.e., Vcc) and the outputs maj1, maj0 of the comparison circuit 30n are zero (i.e., the outputs of the two branches E, F are the same). The inversion logic circuit 306 (FIG. 3) will not perform inversion processing when both outputs maj1, maj0 of the comparison circuit 305 are zero, since this represents the precharge mode of the circuit 304.

When the clock signal CLK goes high, the circuit 304 is in a voter mode. During the voter mode, the high clock signal CLK turns off the first, third, fourth, sixth and seventh p-channel transistors 310, 316, 324, 332, 336 and turns on the second n-channel transistor 326. The nine n-channel transistors 320, 322 of the first summer circuit 319 and the nine n-channel transistors 340, 342 of the second summer circuit 339 start pulling the nodes A, B, C, D low (towards the ground potential via the second n-channel transistor 326).

At the end of the pre-charge stage, transistors 318 and 338 are off since the voltages on all their three terminals is the same (Vcc). When node B or D is pulled down to Vcc−Vt, transistors 318 or 338 turn on. This causes nodes A or C to be pulled down towards ground switching off the opposite transistor 338 or 318. For example, if the first summer circuit 319 has the most high inputs (representing the advantage without inversion A(bn), A(inv)), the second node B is pulled down to Vcc−Vt faster than the fourth node D is pulled down. This starts to pull the first node A down, which causes the third n-channel transistor 338 to turn off since its gate is connected to node A. Node C remains high, which keeps the first n-channel transistor 318 on.

At this point, the two inverters 314, 334 use the voltage levels at the first and third nodes A, C to output the first and second majority outputs maj1, maj0. If the voltage at the first node A is high, then the first inverter 314 outputs a low first majority output maj1. If the voltage at the first node A is low, then the first inverter 314 outputs a high first majority output maj1. Likewise, if the voltage at the third node C is high, then the second inverter 334 outputs a low second majority output maj0. If the voltage at the third node C is low, then the second inverter 334 outputs a high second majority output maj0. It should be noted that the majority voter circuit 304 is designed such that when the circuit is in the voter mode, one of the majority outputs maj1, maj0 is high and the other is low (i.e., the output of the two branches E, F have different values).

The inversion logic circuit 306 (FIG. 3) will perform inversion processing when one of the majority outputs maj1, maj0 is high and the other is low, since this represents the voter mode of the circuit 304. It should be noted that the voter circuit 304 performs its evaluation in about 1.5 gate delays (based on the fan out of the inverters). Conventional digital logic uses significantly more gate delays because they often include several adder circuits. The illustrated voter 304 consists of thirty-two transistors whereas the conventional logic approach uses more than a hundred to implement its majority voter function.

Other majority voter circuits have used analog differential amplifiers such as the one shown in the article "A 50% Noise Reduction Interface Using Low-Weight Coding" by Nakamura et al., 1996 Symposium on VLSI Circuits Digest of Technical Papers. These majority voter circuits, however, have the disadvantage of having a continuous power drain and may require additional level translator circuits. Moreover, due to an apparent lack of regenerative feedback, the evaluation times may be long particularly when nearly the same number of transistors are conducting in the two branches. As such, the present invention is more desirable than the conventional majority voter and bus inversion logic schemes.

Figure 5:
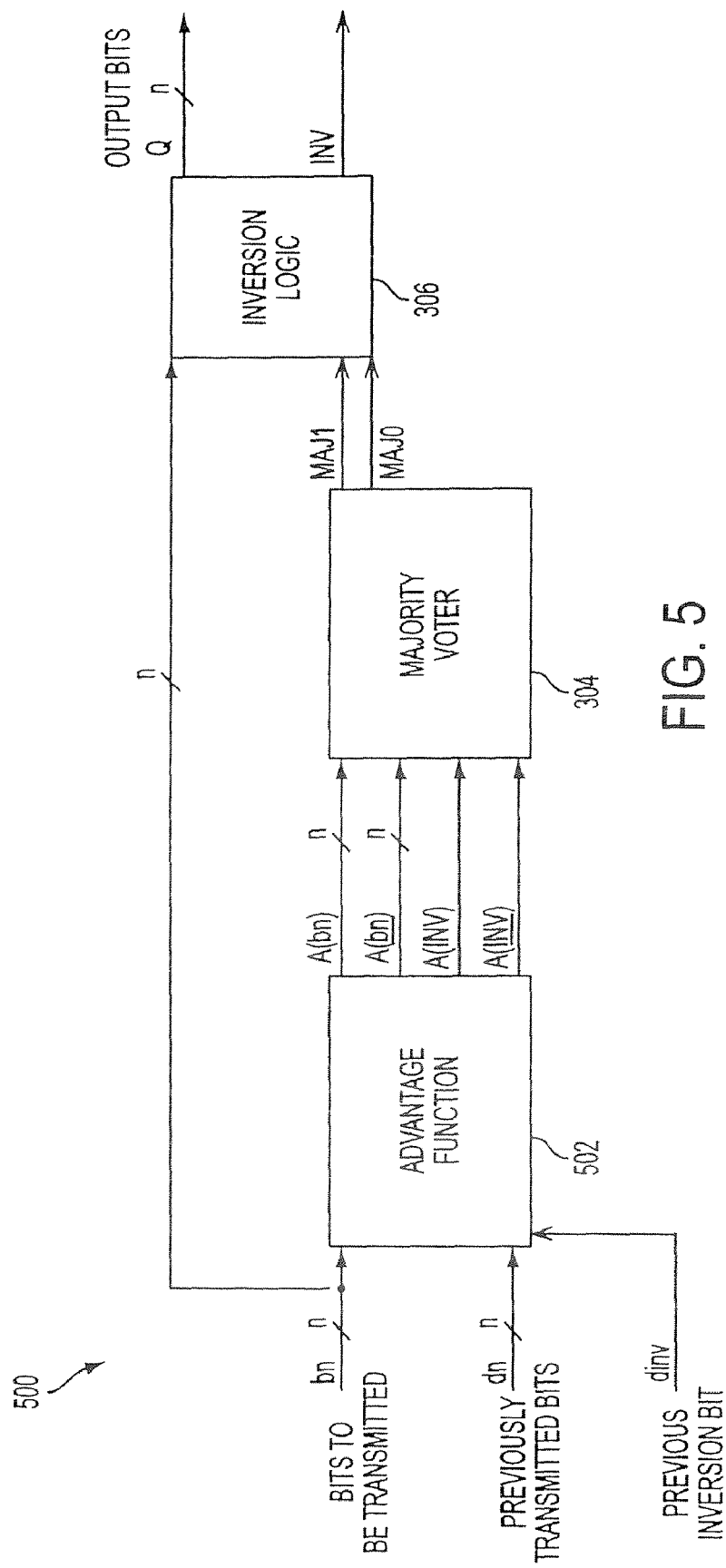
FIG. 5 is a block diagram illustrating a bus inversion circuit constructed in accordance with another exemplary embodiment of the invention.

FIG. 5 is a block diagram illustrating a bus inversion circuit 500 constructed in accordance with another exemplary embodiment of the invention. The illustrated circuit 500 includes a modified advantage function circuit 502 and the majority voter circuit 304 and inversion logic 306 previously described above with respect to FIG. 3.

The advantage function circuit 502 inputs n bits to be transmitted bn (i.e., preview bits), n previously transmitted bits dn and the previously transmitted inversion bit dinv. The advantage function circuit 502 calculates the advantage of inversion and non-inversion for each bit and the corresponding inversion bit, and outputs the advantages of non-inversion A(bn) and inversion A($\overline{bn}$) for each bit, and the advantages of non-inversion A(inv) and inversion A($\overline{inv}$) for the inversion bit. Although the advantages A(bn), A($\overline{bn}$), A(inv), A($\overline{inv}$) may be computed in numerous ways, in the illustrated embodiment, it is desirable that the advantage function 502 use an exclusive NOR ("XNOR") between the preview bits and the last bits transmitted on the bus since it is receiving the preview bits bn, previously transmitted bits dn and the previously transmitted inversion bit dinv. That is, A(bn)=(bn XNOR dn) and A(inv)=(1 XNOR dinv) as described above with respect to FIG. 3. This type of advantage function circuit 502 is useful when the main objective of the bus inversion process is to minimize the number of transitions (i.e., reduce switching noise) of the bits on the bus (including the inversion bit line).

Figure 6:
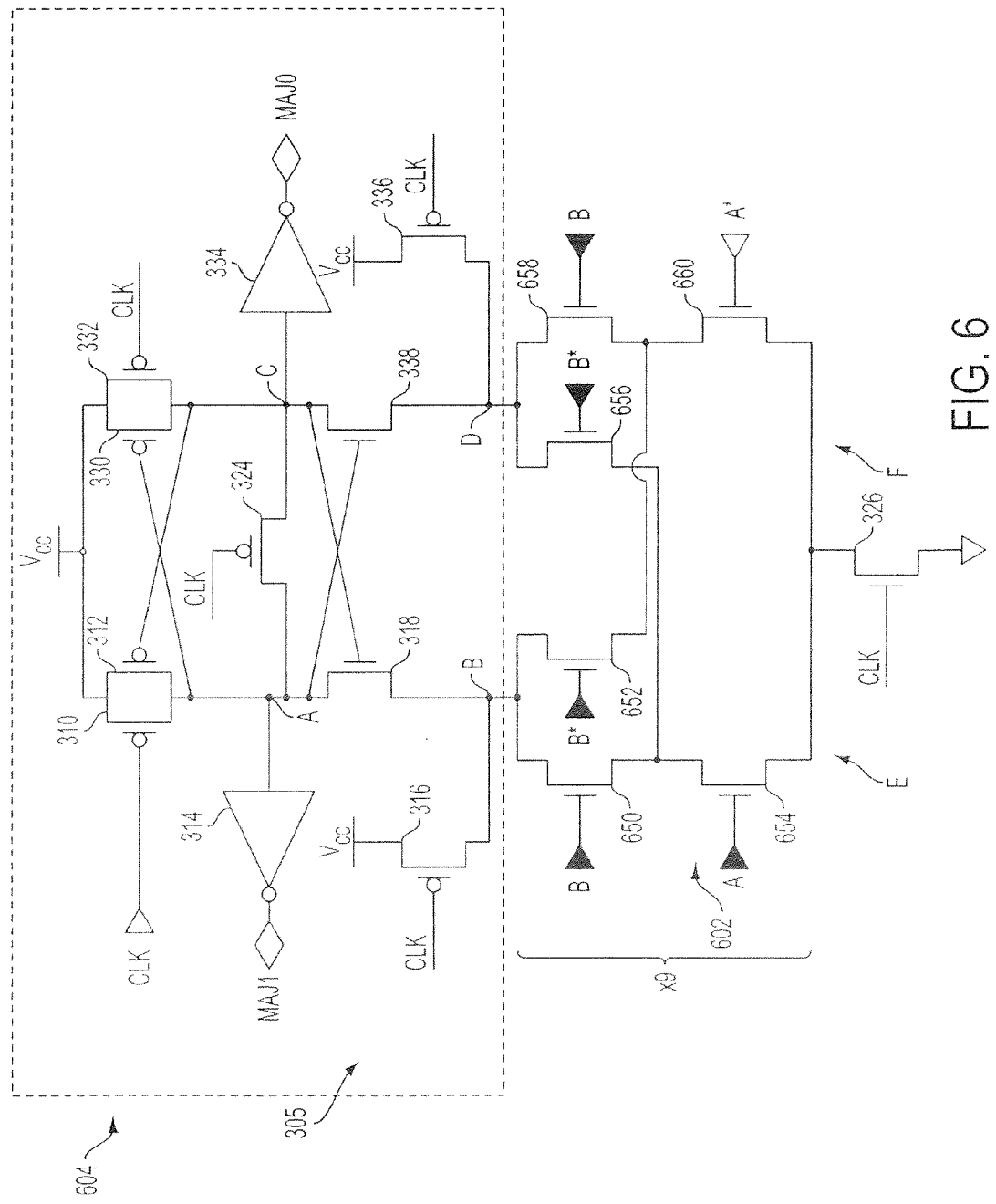
FIG. 6 is a schematic diagram illustrating an exemplary majority voter constructed in accordance with another embodiment of the invention.

FIG. 6 is a schematic diagram illustrating an exemplary majority voter circuit 604 constructed in accordance with another embodiment of the invention. The illustrated voter circuit 604 comprises the comparison circuit 305 (described above with respect to FIG. 4) and an advantage function circuit 602. That is, in the illustrated majority voter circuit 604, the summer circuits 319, 339 (FIG. 4) are replaced by the advantage function circuit 602. The circuit 604 would be connected to the n bits to be transmitted bn (i.e., preview bits), inverted preview bits, the n previously transmitted bits dn, inverted previously transmitted bits, the previously transmitted inversion bit dinv and an inverted previously transmitted inversion bit instead of the results of the advantages A(bn), A($\overline{bn}$), A(inv), A($\overline{inv}$).

The advantage function 602 performs XNOR's between n bits to be transmitted bn (i.e., preview bits) and the n previously transmitted bits dn. The advantage function 602 also performs an XNOR of the previously transmitted inversion bit dinv and a predefined default value (e.g., logical one). The letter A is used to indicate a first input (e.g., preview bit), A* indicates an inverted first input (e.g., inverted preview bit), B is used to indicate a second input (e.g., previously transmitted bit), and B* is used to represent the inverted second input (e.g., inverted previously transmitted bit).

The advantage function 602 includes nine XNOR circuits (eight for the bits to be transmitted, one for the inversion bit) comprising seven transistors 650, 652, 654, 656, 658, 660, 326. The first transistor 650 is coupled between the second node B of the comparison circuit 305 and the third transistor 654 and has its gate connected to the second input B. The third transistor 654 has its gate connected to the first input A and is coupled between the first transistor 650 and seventh transistor 326. The second transistor 652 has its gate connected to the inverted second input B* and is coupled between node B and the connection of the fifth and sixth transistors 658, 660. A first branch E of the circuit 604 includes the inverter 314 and nodes A and B of the comparison circuit 305, and the first three transistors 650, 652, 654.

The fourth transistor 656 has its gate connected to the inverted second input B* and is coupled between node D and the connection of the first and third transistors 650, 654. The fifth transistor 658 has its gate connected to the second input B and is coupled between node D and the sixth transistor 660.

The sixth transistor 660 is coupled between the fifth and seventh transistors 658, 326 and has its gate connected to the inverted first input A*. A second branch F of the circuit 604 includes the inverter 334 and nodes C and D of the comparison circuit 305, and the fourth, fifth and sixth transistors 656, 658, 660.

In operation, the advantage function performs an XNOR operation, which causes one of the nodes B, D to be connected to ground via the seventh transistor (during the voter mode). The pulling down of one of the nodes B, D causes different voltages at the first and third nodes A,C, which causes different outputs maj1, maj0 from the inverters 314, 334 (as described above with respect to FIG. 4).

Figure 7:
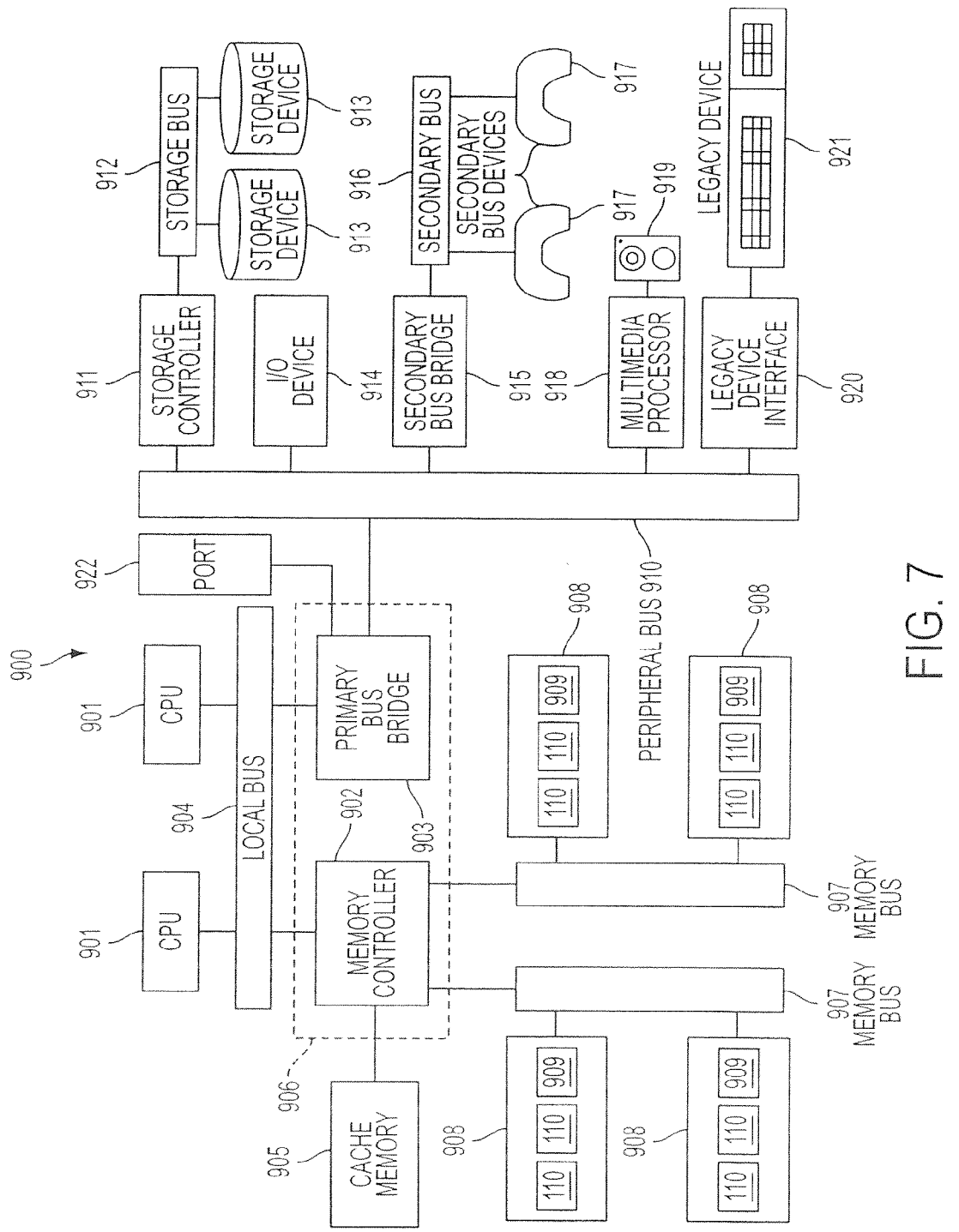
FIG. 7 is a block diagram of a processor system utilizing bus inversion in accordance with any of the embodiments of the invention.

FIG. 7 is a block diagram of a processor system 900 utilizing bus inversion in accordance with any of the embodiments of the invention. That is, any of the components connected to the buses discussed below may utilize bus inversion as described above with respect to FIGS. 2-6, when it is deemed beneficial to do so. The processing system 900 includes one or more processors 901 coupled to a local bus 904. A memory controller 902 and a primary bus bridge 903 are also coupled to the local bus 904. The processing system 900 may include multiple memory controllers 902 and/or multiple primary bus bridges 903. The memory controller 902 and the primary bus bridge 903 may be integrated as a single device 906.

The memory controller 902 is also coupled to one or more memory buses 907. Each memory bus accepts memory components 908. The memory components 908 may be a memory card or a memory module. Examples of memory modules include single inline memory modules (SIMMs) and dual inline memory modules (DIMMs). The memory components 908 may include one or more additional devices 909, 110. For example, in a SIMM or DIMM, the additional device 909 might be a configuration memory, such as a serial presence detect (SPD) memory. The memory controller 902 may also be coupled to a cache memory 905. The cache memory 905 may be the only cache memory in the processing system. Alternatively, other devices, for example, processors 901 may also include cache memories, which may form a cache hierarchy with cache memory 905. If the processing system 900 include peripherals or controllers which are bus masters or which support direct memory access (DMA), the memory controller 902 may implement a cache coherency protocol. If the memory controller 902 is coupled to a plurality of memory buses 907, each memory bus 907 may be operated in parallel, or different address ranges may be mapped to different memory buses 907.

The primary bus bridge 903 is coupled to at least one peripheral bus 910. Various devices, such as peripherals or additional bus bridges may be coupled to the peripheral bus 910. These devices may include a storage controller 911, a miscellaneous I/O device 914, a secondary bus bridge 915, a multimedia processor 918, and a legacy device interface 920. The primary bus bridge 903 may also coupled to one or more special purpose high speed ports 922. In a personal computer, for example, the special purpose port might be the Accelerated Graphics Port (AGP), used to couple a high performance video card to the processing system 900.

The storage controller 911 couples one or more storage devices 913, via a storage bus 912, to the peripheral bus 910. For example, the storage controller 911 may be a SCSI controller and storage devices 913 may be SCSI discs. The I/O device 914 may be any sort of peripheral. For example, the I/O device 914 may be a local area network interface, such as an Ethernet card. The secondary bus bridge may be used to interface additional devices via another bus 916 to the processing system. For example, the secondary bus bridge may be a universal serial port (USB) controller used to couple USB devices 917 to the processing system 900. The multimedia processor 918 may be a sound card, a video capture card, or any other type of media interface, which may also be coupled to one additional devices such as speakers 919. The legacy device interface 920 is used to couple legacy devices 921, for example, older styled keyboards and mice, to the processing system 900.

The processing system 900 illustrated in FIG. 7 is only an exemplary processing system with which the invention may be used. While FIG. 7 illustrates a processing architecture especially suitable for a general purpose computer, such as a personal computer or a workstation, it should be recognized that well known modifications can be made to configure the processing system 900 to become more suitable for use in a variety of applications. For example, many electronic devices which require processing may be implemented using a simpler architecture which relies on a CPU 901 coupled to memory components 908. These electronic devices may include, but are not limited to audio/video processors and recorders, gaming consoles, digital television sets, wired or wireless telephones, navigation devices (including system based on the global positioning system (GPS) and/or inertial navigation), and digital cameras and/or recorders. The modifications may include, for example, elimination of unnecessary components, addition of specialized devices or circuits, and/or integration of a plurality of devices.

It should be noted that the advantage functions of the present invention have been illustrated with binary and XNOR examples, but it should be appreciated that the invention is not limited to these types of advantage functions. It should be appreciated that an n-bit binary function could be used where n transistors with binary weighted drive strength could be used in the summation paths on either side and for either set of inputs. Alternatively, the output of the advantage function could be a one-of-n signal where n transistors of appropriate drive strength could be used for each input. Thus, the illustrated majority voter can be adapted to support more complex bus encoding decisions.

The processes and devices described above illustrate exemplary methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A bus inversion system comprising:
   an advantage function circuit adapted to input bits to be transmitted over a bus, said advantage function circuit adapted to calculate an advantage of inversion and an advantage of non-inversion for each input bit and being adapted to calculate an advantage of inversion and an advantage of non-inversion for at least one inversion bit to be transmitted over the bus; said advantage function circuit having a plurality of first and second outputs, and at least one third and fourth outputs;
   a first circuit branch connected to receive the plurality of first outputs, each first output representing the advantage of inversion for a respective bit to be transmitted over the bus, said first branch being connected to the at least one third output representing the advantage of inversion for the at least one inversion bit, wherein said first circuit branch comprises:
- a first inverter corresponding to a summation of said first and third outputs, wherein said first inverter comprises an input electrically coupled to a first node, and
- a plurality of first transistors connected in parallel between the first node and a ground potential, each first transistor respectively having a gate terminal connected to one of the first or third outputs, said plurality of first transistors changing a potential at the first node based on the first and third outputs; and
- a circuit branch connected to receive the plurality of second outputs, each second output representing the advantage of non-inversion for a respective bit to be transmitted over the bus, said circuit branch being connected to the at least one fourth output representing the advantage of non-inversion for the at least one inversion bit, said circuit branch having a branch output corresponding to a summation of said second and fourth outputs.

2. The system of claim 1, wherein said first inverter has a first value indicating that the bits to be transmitted should be transmitted without inversion and said branch output has a second value indicating that the bits to be transmitted should be transmitted with inversion.

3. The system of claim 1, wherein said first inverter has a first value indicating that the bits to be transmitted should be transmitted with inversion and said branch output has a second value indicating that the bits to be transmitted should be transmitted without inversion.

4. The system of claim 1, wherein said advantages are binary advantages.

5. The system of claim 1, wherein said advantages are non-binary advantages.

6. The system of claim 1 wherein said circuit branch comprises:
- a second inverter having an input electrically coupled to a second node, said second inverter output being the branch output; and
- a plurality of second transistors connected in parallel between the second node and the ground potential, each second transistor respectively having a gate terminal connected to one of the second or fourth outputs, said plurality of second transistors changing a potential at the second node based on the second and fourth outputs.

7. A bus inversion system comprising: an advantage function circuit adapted to input bits to be transmitted over a bus, said advantage function circuit adapted to calculate an advantage of inversion and an advantage of non-inversion for each input bit and being adapted to calculate an advantage of inversion and an advantage of non-inversion for at least one inversion bit to be transmitted over the bus; said advantage function circuit having a plurality of first and second outputs, and at least one third and fourth outputs;
- a first summer circuit connected to the plurality of first outputs, each first output representing an advantage of inversion for a respective bit to be transmitted over the bus, said first summer circuit being connected to the at least one third output representing the advantage of inversion for the at least one inversion bit to be transmitted over the bus, wherein said first summer circuit comprises: a first summer output coupled to a first node, and a plurality of first transistors connected in parallel between the first node and a ground potential, each first transistor respectively having a gate terminal connected to one of the first or third outputs, said plurality of first transistors changing a potential at the first node based on the first and third outputs;
- a second summer circuit connected to the plurality of second outputs, each second output representing an advantage of non-inversion for a respective bit to be transmitted over the bus, said second summer circuit being connected to the at least one fourth output representing the advantage of non-inversion for the at least one inversion bit, wherein said second summer circuit comprises a second summer output coupled to a second node; and
- a comparison circuit coupled to said first and second nodes and having a first comparison output indicative of whether the bits should be transmitted without inversion.

8. The system of claim 7, wherein said comparison circuit comprises a second comparison output indicative of whether the bits should be transmitted with inversion.

9. The system of claim 7, wherein said second summer circuit comprises:
- a plurality of second transistors connected in parallel between the second node and the ground potential, each second transistor respectively having a gate terminal connected to one of the second or fourth outputs, said plurality of second transistors changing a potential at the second node based on the second and fourth outputs.

* * * * *